(12) United States Patent
Lo et al.

(10) Patent No.: US 10,605,665 B2
(45) Date of Patent: Mar. 31, 2020

(54) METHOD FOR MEASURING TEMPERATURE OF PROCESS AREA

(71) Applicants: NATIONAL CHENG KUNG UNIVERSITY, Tainan (TW); National Chung-Shan Institute of Science & Technology, Taoyuan (TW)

(72) Inventors: Yu-Lung Lo, Tainan (TW); Chi-Guang Ren, Hsinchu (TW)

(73) Assignees: NATIONAL CHENG KUNG UNIVERSITY, Tainan (TW); National Chung-Shan Institute of Science & Technology, Taoyuan (TW)

( * ) Notice: Subject to any disclaimer, the term of this patent is extended or adjusted under 35 U.S.C. 154(b) by 388 days.

(21) Appl. No.: 15/800,045

(22) Filed: Oct. 31, 2017

(65) Prior Publication Data

US 2019/0128738 A1    May 2, 2019

(51) Int. Cl.
| | |
|---|---|
| *G01J 5/00* | (2006.01) |
| *G01J 5/10* | (2006.01) |
| *G01J 5/60* | (2006.01) |
| *B29C 64/386* | (2017.01) |
| *G01J 5/52* | (2006.01) |
| *G01J 5/08* | (2006.01) |
| *B29C 64/393* | (2017.01) |
| *B33Y 50/02* | (2015.01) |

(Continued)

(52) U.S. Cl.
CPC ............ *G01J 5/0003* (2013.01); *B29C 64/386* (2017.08); *B29C 64/393* (2017.08); *B33Y 10/00* (2014.12); *B33Y 50/02* (2014.12); *G01J 5/08* (2013.01); *G01J 5/10* (2013.01); *G01J 5/522* (2013.01); *G01J 5/60* (2013.01); *B29C 64/153* (2017.08)

(58) Field of Classification Search
CPC ... B29C 64/153; B29C 64/386; B29C 64/393; B33Y 10/00; B33Y 50/02; G01J 5/0003; G01J 5/08; G01J 5/10; G01J 5/522; G01J 5/60

See application file for complete search history.

(56) References Cited

U.S. PATENT DOCUMENTS

| | | | |
|---|---|---|---|
| 2008/0223832 A1* | 9/2008 | Song | B23K 26/03 219/121.66 |
| 2015/0375456 A1 | 12/2015 | Cheverton et al. | |

(Continued)

FOREIGN PATENT DOCUMENTS

CN        106061714 A        10/2016

OTHER PUBLICATIONS

Tapetado, Alberto, José Díaz-Álvarez, María Henar Miguélez, and Carmen Vázquez. "Two-color pyrometer for process temperature measurement during machining." Journal of lightwave technology 34, No. 4 (2016): 1380-1386. (Year: 2016).*

*Primary Examiner* — Aniss Chad
(74) *Attorney, Agent, or Firm* — CKC & Partners Co., LLC (57) ABSTRACT

A method for measuring a temperature of a process area is provided. A simulation computation is performed to obtain a simulation temperature. A ratio-pyrometer with two one-color modes is used to measure the temperature of the process area, and a first emissivity value and a second emissivity value are acquired. An emissivity ratio is set to a ratio of the second emissivity value to the first emissivity value, and the ratio-pyrometer in the two-color mode is used to measure the temperature of the process area.

10 Claims, 8 Drawing Sheets
(1 of 8 Drawing Sheet(s) Filed in Color)

(51) Int. Cl.
*B33Y 10/00* (2015.01)
*B29C 64/153* (2017.01)

(56) References Cited

U.S. PATENT DOCUMENTS

2016/0184893 A1 6/2016 Dave et al.
2016/0185048 A1 6/2016 Dave et al.
2016/0339642 A1* 11/2016 Donovan .............. B29C 64/165

* cited by examiner

METHOD FOR MEASURING TEMPERATURE OF PROCESS AREA

BACKGROUND

Field of Invention

The present invention relates to a method for measuring a temperature of a process area. More particularly, the present invention relates to a method for measuring a temperature of a process area by using a ratio-pyrometer.

Description of Related Art

Additive manufacturing (AM), also referred to as 3D-printing, is a technique of heating metal powders or plastic material to be melt-shapeable after a digital computing model file is built, and then fabricating a workpiece by stacking layers. A powder bed fusion process is one of popular additive manufacturing techniques. The powder bed fusion process may be such as a selective laser melting (SLM) process, or a selective laser sintering (SLS) process.

The selective laser melting process is performed by placing powders on a substrate, and using a high energy laser to irradiate a position at which a powder molding is desired to be formed, thereby melting and fusing the powders. The selective laser sintering process is also performed by using a laser to irradiate powders to sinter and fuse the powers into blocks, and then placing another layer of powders thereon to repeat the laser process until the product is formed. The quality of the product is determined by various process parameters, such as powder size distribution, melting pool area, melting pool temperature and laser-related parameters (such as laser power, laser spot size, scanning speed, hatch and etc.), which are important processing parameters for a powder bed fusion process, in which of the measurement of melting pool temperature may help to adjust other processing parameters.

Conventionally, a melting pool temperature is measured by using a brightness pyrometer. The measurement is performed by projecting a radiation brightness plane of a melting pool onto a filament plane, and adjusting the voltage or current through the filament until the filament seems to disappear from the projection plane, and the resulted voltage or current is corresponding to a brightness temperature of a blackbody.

A conventional optical pyrometer, also referred to as a single-color pyrometer, measures a temperature of an object to be measured by equalizing the spectral radiance of the object to that of a blackbody, and if the emissivity of the object is known, the true temperature of the object can be related to the apparent temperature of the blackbody. Generally, the emissivity is a ratio of radiation energy of an object to radiation energy of a blackbody with the same temperature as the object, and depends on temperature, emissive direction and wavelength. Accordingly, although the optical pyrometer may measure the temperature of the object with certain, yet the correct emissivity has to be set beforehand. In other words, the correct emissivity setting is critical to acquiring the temperature of the object to be measured. Moreover, while the measurement is performed by using the optical pyrometer, the object to be measured has to be completely within a measuring spot size of the optical pyrometer, or the measured temperature would include a temperature of the measuring spot size within which no object to be measured is located (also referred to as a background temperature). Furthermore, since the temperature measurement principle of the optical pyrometer is to calculate an average temperature of temperatures at all measuring points in the measuring spot size as a measured temperature. When the area of the object to be measured is smaller than the measuring spot size, the average temperature of the measuring spot size calculated by the optical pyrometer will not be the average temperature of the object to be measured because of the background temperature, thus failing to obtain the temperature of the object to be measured accurately.

In view of the foregoing, there is a need to provide a method for measuring a temperature of a process area to accurately measure and obtain an actual temperature of the process area.

SUMMARY

An aspect of the present invention provides a method for measuring a temperature of a process area. A ratio-pyrometer can be accurately set up by combining practical measurements with a simulation computation, and a real temperature of the process area may be measured.

According to the aspect of the present invention, providing a method for measuring a temperature of a process area. First, a ratio-pyrometer is provided to measure the temperature of the process area. The ratio-pyrometer has a one-color mode and a two-color mode, and the one-color mode includes a first one-color mode and a second one-color mode. The first one-color mode and the second one-color mode perform respective measurements within a first measuring wavelength range and a second measuring wavelength range emitted from the process area. The first one-color mode and the second one-color mode perform respective measurements based on emissivities of the process area, and the two-color mode performs measurement based on an emissivity ratio between the emissivities under the first one-color mode and the second one-color mode. Then, a simulation computation is performed on the process area to obtain a simulation temperature field including simulated process area temperatures. Thereafter, the simulation temperature field is used to calculate a first simulation temperature of the process area according to a first algorithm. The first simulation temperature represents the temperature of the process area obtained by the ratio-pyrometer in the one-color mode.

Then, the emissivity of the process area is set to a first emissivity and a second emissivity, respectively for using the ratio-pyrometer, to perform first measurements and second measurements on the process area in the first one-color mode and the second one-color mode, respectively. Thereby, first temperatures corresponding to the first emissivity and second temperatures corresponding to the second emissivity are acquired. The first emissivity is used as a first emissivity value when an average error between the first temperatures and the first simulation temperature is smaller than or equal to a first default percentage. The second emissivity is used as a second emissivity value when an average error between the second temperatures and the first simulation temperature is smaller than or equal to the first default percentage. When the average error between the first temperatures and the first simulation temperature and/or the average error between the second temperatures and the first simulation temperature are or is greater than the first default percentage, the first emissivity and/or the second emissivity is adjusted iteratively until the average error between the first temperatures and the first simulation temperature and/or the average error between the second temperatures and the first simulation temperature are or is smaller than or equal to the first default percentage. Thereafter, the emissivity ratio is set to a ratio of the second emissivity value to the first emissivity value, and the ratio-pyrometer is used to measure the temperature of the process area in the two-color mode.

According to an embodiment of the present invention, the first default percentage is substantially between 0% and 5%.

According to an embodiment of the present invention, the first algorithm has parameters including a number of first nodes of a simulated measuring spot size including a simulated process area corresponding to the simulation temperature field, a number of second nodes of the simulated process area corresponding to the simulation temperature field, simulated process area temperature, and a setting temperature of the ratio-pyrometer.

According to an embodiment of the present invention, a ratio of the number of first nodes to the number of second nodes is equal to a ratio of an area of the simulated measuring spot size to an area of the simulated process area.

According to an embodiment of the present invention, the first area of the simulated measuring spot size is modified by an incident angle and a focal length of the ratio-pyrometer.

According to an embodiment of the present invention, the method further comprises using the simulation temperature field to calculate a second simulation temperature of the process area according to a second algorithm before measuring the temperature of the process area. The second simulation temperature is representing the temperature of the process area obtained by the ratio-pyrometer in the two-color mode. The second algorithm is different from the first algorithm. Then the emissivity ratio is set to a ratio of the second emissivity value to the first emissivity value for the ratio-pyrometer in the two-color mode to perform third measurements on the process area, and third temperatures are acquired. The ratio of the second emissivity value to the first emissivity value is used as the emissivity ratio when an average error between the third temperatures and the second simulation temperature is smaller than or equal to a second default percentage. When an average error between the third temperatures and the second simulation temperature is greater than the second default percentage, the first emissivity value and/or the second emissivity value is adjusted iteratively until the average error between the third temperatures and the second simulation temperature is smaller than or equal to the second default percentage.

According to an embodiment of the present invention, the second default percentage is substantially between 0% and 15%.

According to an embodiment of the present invention, the second algorithm has parameters including the number of nodes of the simulated process area corresponding to the simulation temperature field and the simulated process area temperature.

According to an embodiment of the present invention, the simulation computation is used for a powder bed fusion process. The simulation computation includes providing powder bed parameters data and performing a powder bed simulation with the powder bed parameters data. The powder bed includes a substrate and a powder layer, and the powder layer includes powders. The powder bed parameters data includes a powder size distribution, a powder layer thickness, a size of a powder container and properties of a powder bed material. A packing density of a powder layer, coordinate data of the powders and a thermal conductivity of the powder layer are acquired by the powder bed simulation.

Then, the simulation computation further comprises obtaining first laser parameters data and second laser parameters data corresponding to a laser beam, and obtaining a first refractive index of the powder and a second refractive index of the substrate according to the first laser parameters data. The first laser parameters data includes a wavelength of the laser beam, a radius of the laser beam and an incident angle of the laser beam. The second laser parameters data includes a power of the laser beam, the radius of the laser beam, the incident angle of the laser beam and a scanning speed of the laser beam. Thereafter, a ray tracing simulation is performed with the coordinate data of the powders, the first refractive index, the second refractive index and the first laser parameters data to acquire an absorptivity profile data of the powder layer. The absorptivity profile data is an average absorptivity of the laser beam to a thickness of the powder layer.

Then, a heat transfer simulation is performed with the absorptivity profile, the packing density, the thermal conductivity, the second laser parameters data and the properties of the powder bed material to acquire the simulation temperature field. The simulation temperature field includes a temperature distribution of the substrate, the powder layer and a melting pool. The melting pool includes a first region of the powder layer with a temperature higher than a melting point of the powder layer and/or a second region of the substrate with a temperature higher than a melting point of the substrate.

According to an embodiment of the present invention, the process area is the melting pool.

The method for measuring a temperature of a process area of the present invention uses the simulation computation to acquire simulation temperature of the process area, and measures the temperature of the process area by using the ratio-pyrometer in the one-color mode to find the first emissivity value and the second emissivity value. The ratio of the second emissivity value to the first emissivity value can be used as the emissivity ratio for the ratio-pyrometer in the two-color mode for measuring the temperature of the process area.

It is to be understood that both the foregoing general description and the following detailed description are by examples, and are intended to provide further explanation of the invention as claimed.

BRIEF DESCRIPTION OF THE DRAWINGS

The application file contains at least one drawing executed in color. Copies of this patent or patent application publication with color drawing(s) will be provided by Office upon request and payment of the necessary fee. The invention can be more fully understood by reading the following detailed description of the embodiment, with reference made to the accompanying drawings as follows.

DETAILED DESCRIPTION

According to the above, the problems about background temperature and emissivity setting faced when using the optical pyrometer can be solved by using the ratio-pyrometer. Since the ratio-pyrometer measures the temperature based on an emissivity ratio, it is also referred to as a two-color pyrometer. The measurement of the ratio-pyrometer is performed within two measuring wavelength ranges, and if the two wavelength ranges are close to each other and the measured surface is grey, the dependency of the emissivity on the wavelength can be ignored. Moreover, when the measurement of temperature is performed on the object to be measured by using the ratio-pyrometer in two-color mode, even though the area of the object is smaller than the area of measuring spot size, the background temperature do the same effect on the measurements with both measuring wavelength range, the background effect can be ignored. Additionally, the typical method for determining the emissivity ratio of the ratio-pyrometer is to resolve an emissivity slope (E-slope) by experiment, and then use it to do adjustment. However, the typical method is inefficient and inaccurate, so that the ratio-pyrometer cannot measure the temperature accurately.

Therefore, the present invention provides a method for measuring a temperature of a process area, which obtaining the emissivity and the emissivity ratio of the ratio-pyrometer in the one-color mode and the two-color mode by combining practical measurement with simulation computation, to measure a real temperature of the process area.

Figure 1:
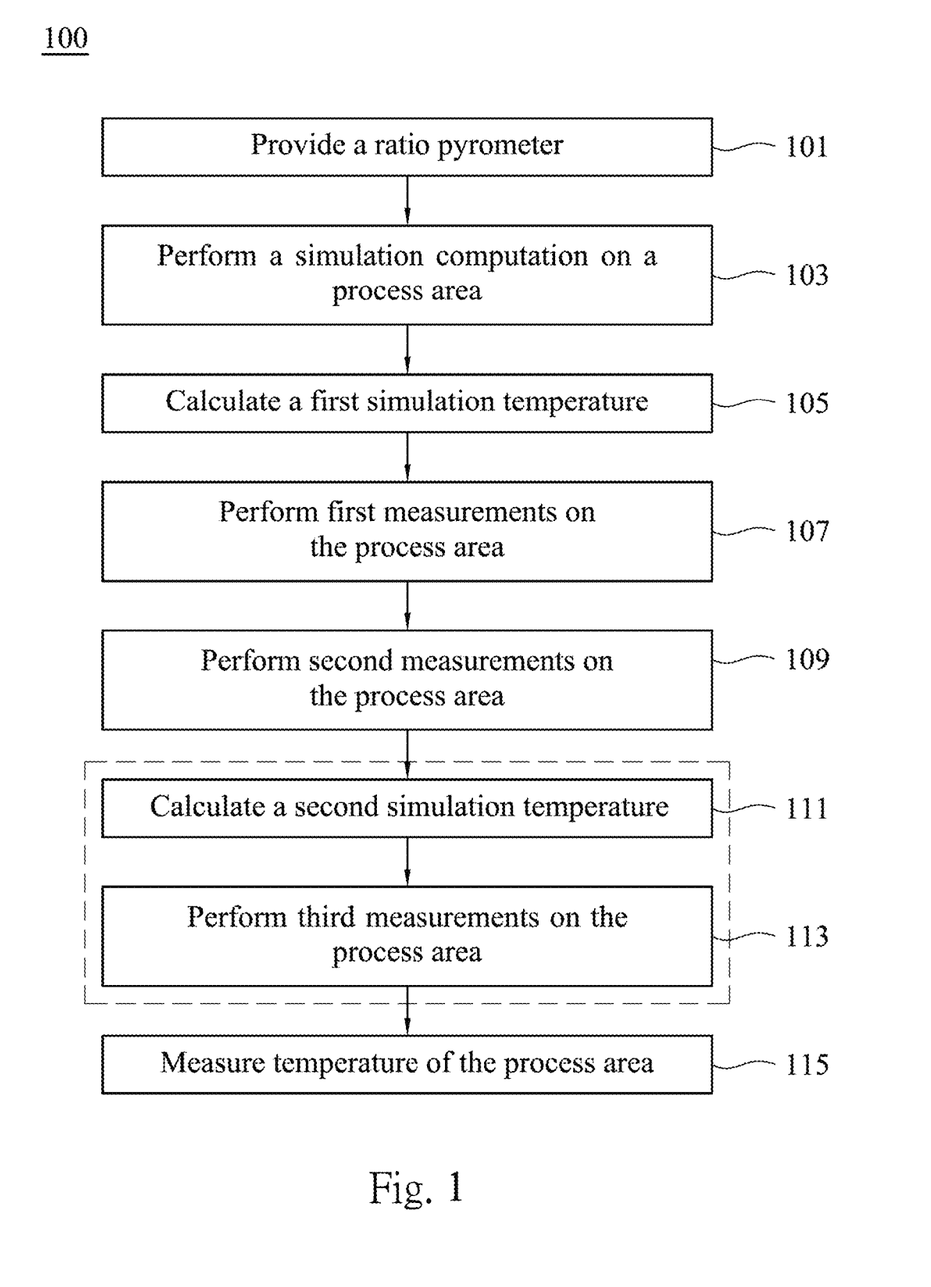
FIG. 1 is a flow diagram of a method for measuring a temperature of a process area using a ratio-pyrometer according to one embodiment of the present invention.

Referring to FIG. 1, FIG. 1 is a flow diagram of a method 100 for measuring a temperature of a process area using a ratio-pyrometer according to one embodiment of the present invention. First, performing step 101, a ratio-pyrometer is provided. The ratio-pyrometer may obtain a temperature of an object to be measured (i.e. the process area in the present invention) by transforming the infrared radiation energy from the object to be measured into an electrical signal. In an embodiment, the ratio-pyrometer has a one-color mode and a two-color mode, in which the one-color mode performs measurement based on an emissivity, and the two-color mode performs measurement based on an emissivity ratio. The emissivity of the object to be measured depends on its temperature, so that, the emissivity and the emissivity ratio should be accurately set in the one-color mode and the two-color mode, respectively, hence the accurate temperature may be obtained by the ratio-pyrometer. Generally, the one-color mode performs the measurement in the specific wavelength range. In an embodiment, the one-color mode of the ratio-pyrometer includes a first one-color mode and a second one-color mode, in which the first one-color mode and the second one-color mode perform measurements within a first measuring wavelength range and a second measuring wavelength range emitted from the process area, respectively. In an example, the first measuring wavelength range is between 1450 nm and 1650 nm, while the second measuring wavelength range is between 1650 nm and 1800 nm.

Then, the method 100 proceeds to step 103, a simulation computation is performed on the process area to obtain a simulation temperature field. The simulation temperature field includes simulated process area temperatures of the process area. In an embodiment, the simulation computation is used for a powder bed fusion process. In an example, the simulation computation is used for selective laser sintering (SLS) process or selective laser melting (SLM) process.

Figure 2:
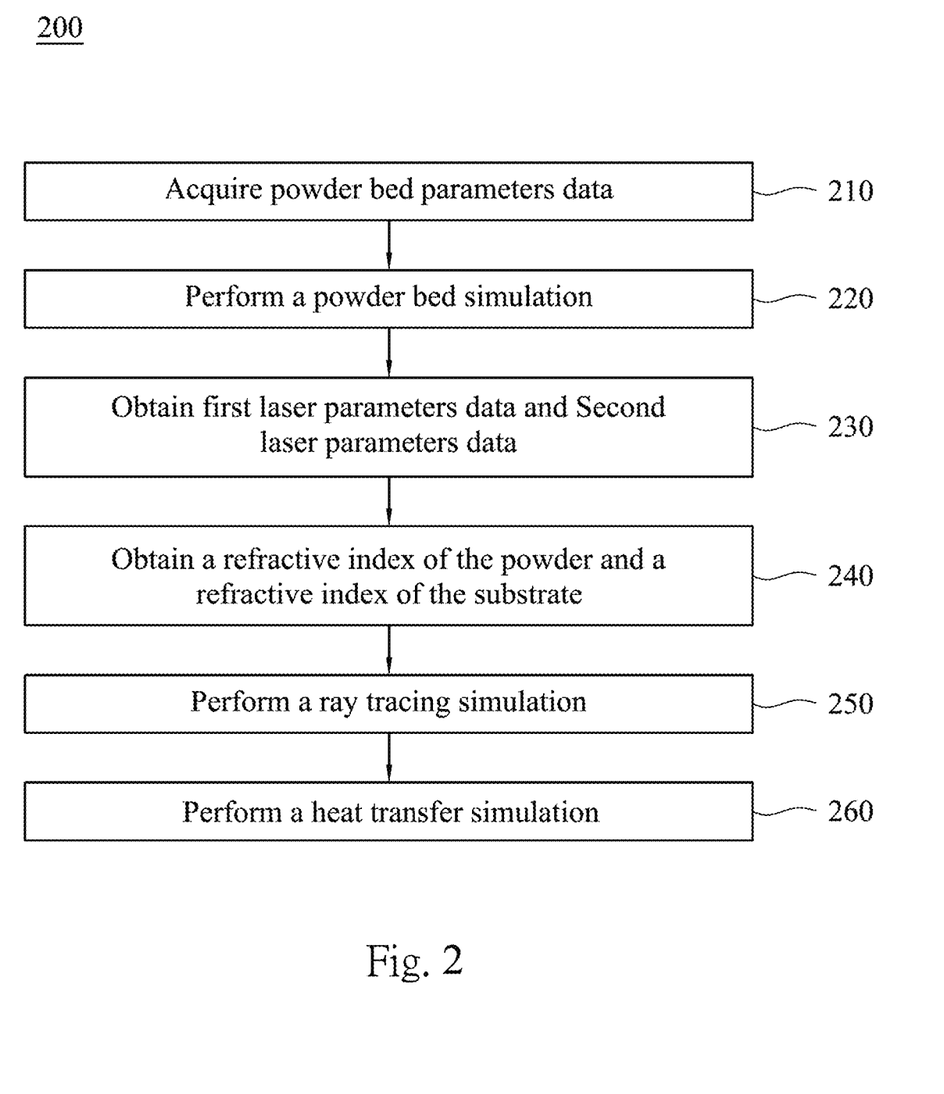
FIG. 2 is a flow diagram of a method of a simulation computation according to one embodiment of the present invention.

Referring to FIG. 2, FIG. 2 is a flow diagram of a method 200 of a simulation computation according to one embodiment of the present invention. As an example, the method 200 is used for a selective laser melting process. First, performing step 210, a set of powder bed parameters data is acquired. In an embodiment, the powder bed parameters data at least includes a powder size distribution, a powder layer thickness, a size of a powder container (i.e. a length, a width and a height of a powder container) and properties of a powder bed material. In an embodiment, the properties of the powder bed material include a melting point, a boiling point, a thermal conductivity, a specific heat coefficient and a density of the powder bed material. In an embodiment, the powder bed includes a substrate and a powder layer, and the powder layer includes powders.

Then, the method 200 proceeds to step 220, a powder bed simulation is performed with the powder bed parameters data to acquire a packing density of a powder layer, coordinate data of the powders and a thermal conductivity of the powder layer. In an embodiment, the powder size distribution, the powder layer thickness and the size of a powder container are used in step 220 to perform the powder bed simulation. In an embodiment, the powder bed simulation is performed by using MATLAB (Matrix Laboratory), which is computing software. MATLAB is an advanced computation language and interactive environment for algorithms development, data visualization, data analysis, and numerical computation.

In an embodiment, the powder bed simulation is performed based on the sequential addition model. The sequential addition model simulates the powder particles fall sequentially in the vertical direction and come to rest in a stable condition. The stable conditions include when the powder particle reaches the bottom of the container; when the powder particle rests against one of the container walls and two other deposited particles; when the powder particle rests against two of the container walls and a single previously deposited particle; when the powder particle makes contact with three previously deposited particles, in which the triangle area formed by the three previously deposited particles equals to the total area of three triangle area formed by the target powder particle and any two of the three previously deposited particles. It is to be understood that using the sequential addition model is assumed that the deposition of the powder layer is in a slow process. In other words, the powder particles are dropped one-by-one from the top of the container, and each particle is released only when previous particle has attained the stability condition described above. Moreover, the simulation continues until the thickness of the powder layer reaches the top of the container.

The volumes of each powder particles can be obtained by the powder bed simulation, and the packing density (p) can be calculated by formula (I).

$$P = \Sum_{i=1}^{N} V_I / V_C \quad (I)$$

In the formula (I), $V_I$ represents volume of each powder particle, and $V_C$ represents volume of the container.

Then, calculate thermal conductivity of the powder layer ($\lambda_e$) according to formula (II).

$$\frac{\lambda_e}{\lambda_s} = \frac{pn}{\pi} x \quad (II)$$

In the formula (II), $\lambda_s$ represents thermal conductivity of the bulk powder layer material, p represents packing density, n represents the average coordination number (i.e. the average number of powder particles surrounding each powder particle), and x represents contact size ratio, which is the ratio of the contact spot radius to the sphere radius.

Then, the method 200 proceeds to step 230, a first laser parameters data and a second laser parameters data corresponding to a laser beam are obtained. In an embodiment, the first laser parameters data includes a wavelength of the laser beam, a radius of the laser beam and an incident angle of the laser beam, and the second laser parameters data includes a power of the laser beam, the radius of the laser beam, the incident angle of the laser beam and a scanning speed of the laser beam. Thereafter, performing step 240, obtaining a refractive index of the powders and a refractive index of the substrate according to the wavelength of the laser beam provided by the first laser parameters data from step 230.

Then, the method 200 proceeds to step 250, a ray tracing simulation is performed with the coordinate data of the powder from step 220, the first laser parameters data from step 230, the refractive index of the powder and the refractive index of the substrate from step 240 to acquire an absorptivity profile data of the powder layer. The absorptivity profile data is an average absorptivity to the laser beam corresponding to the thickness of the powder layer. In an embodiment, the ray tracing simulation is performed by Zemax, which is optical design software. Zemax is used in optical system design and can simulate ray tracing through an optical element. In an embodiment, ray tracing simulation is Monte Carlo ray tracing simulation. In an embodiment, the energy density can be represented by formula (III).

$$q(r) = \frac{2P}{\pi r_0^2} \exp\left(\frac{-2r^2}{r_0^2}\right) \quad (III)$$

In the formula (III), P represents power of the laser beam, $r_0$ represents radius of the laser beam, and r represents radial distance from a point on the powder bed surface to the center of the laser spot. When the laser beam scans the powder bed surface with a specific speed v for time t, the formula (III) can be written in (x, y) coordinate form as formula (IV).

$$q(x, y, t) = \frac{2P}{\pi r_0^2} \exp\left(\frac{-2[(x-vt)^2 + y^2]}{r_0^2}\right) \quad (IV)$$

For interaction between a single ray and the powder particle, the incident ray is split into a reflected ray and a refracted ray. In the absorbed mechanism, laser energy is absorbed by the powder particles and the substrate. In other words, only part of the energy density described in formula (IV) is actually absorbed along the depth of the powder layer and the substrate. Accordingly, the energy density from the ray tracing simulation may be presented as formula (V).

$$q(x, y, t) = \frac{2P}{\pi r_0^2} \exp\left(\frac{-2[(x-vt)^2 + y^2]}{r_0^2}\right) \frac{dA}{dz} \quad (V)$$

In the formula (V), dA/dz represents the absorptivity along the depth of the powder layer.

Figure 3A:
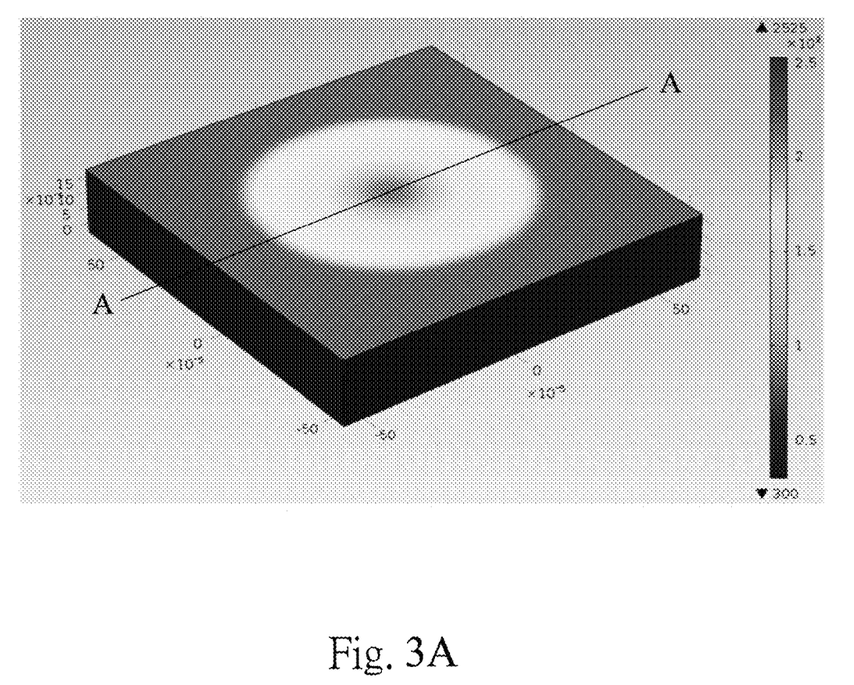
FIG. 3A is a temperature distribution diagram of a substrate, a powder layer and a melting pool obtained from a simulation computation according to one embodiment of the present invention.
Figure 3B:
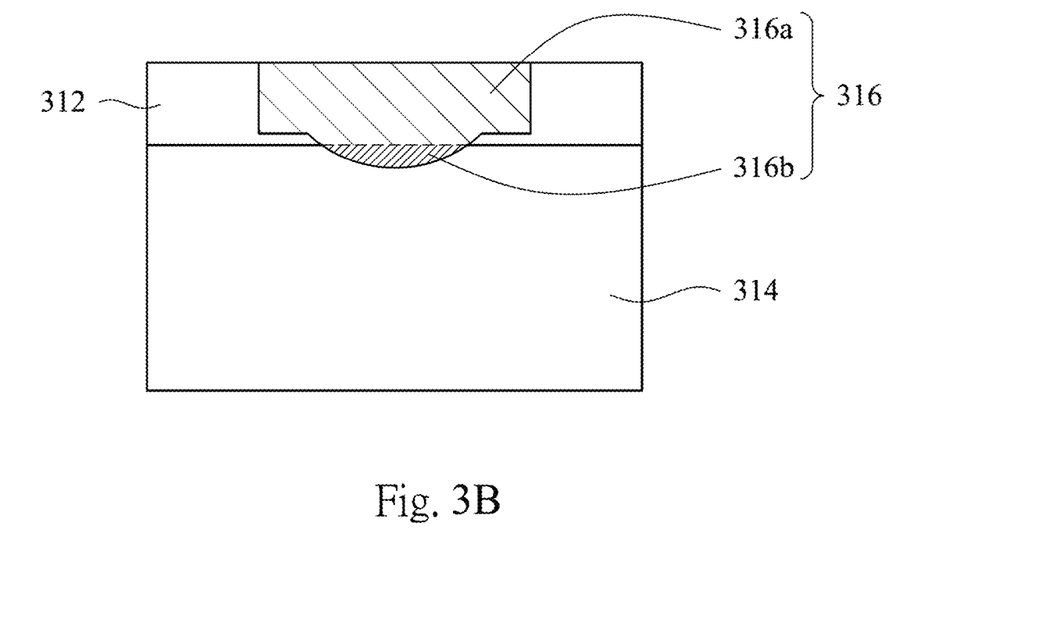
FIG. 3B is a cross-section view along line A-A of FIG. 3A.

Then, the method 200 proceeds to step 260, a heat transfer simulation is performed with the absorptivity profile, the packing density of the powder layer, the thermal conductivity of the powder layer, the second laser parameters data of the laser beam and the properties of the powder bed material to acquire a simulation temperature field including simulated process area temperature. In an embodiment, the simulation temperature field includes temperature distribution of the substrate, the powder layer and the melting pool. Referring to FIG. 3A, FIG. 3A is a temperature distribution diagram of the substrate, the powder layer and the melting pool obtained from the heat transfer simulation according to one embodiment of the present invention. The melting pool refers to a region of melting powder bed. Referring to FIG. 3B, FIG. 3B is a cross-section view along line A-A of FIG. 3A. The melting pool 316 includes a first region 316a, where the temperature of the powder layer 312 is higher than the melting point of the powder layer, and/or a second region 316b, where the temperature of the substrate 314 is higher than the melting point of the substrate. In an embodiment, the heat transfer simulation is finite element heat transfer simulation. In an embodiment, the heat transfer simulation is performed by COMSOL Multiphysics and MATLAB. COMSOL Multiphysics is software used in Multiphysics simulation, which performs data simulation with high accuracy by using high-performance computation and multi-field bidirectional coupling analysis. In an embodiment, there is formula (VI) for three-dimensional heat transfer process.

$$\rho c \frac{\partial T}{\partial t} = q(x, y, z, t) + \frac{\partial}{\partial x}\left(k \frac{\partial T}{\partial x}\right) + \frac{\partial}{\partial y}\left(k \frac{\partial T}{\partial y}\right) + \frac{\partial}{\partial z}\left(k \frac{\partial T}{\partial z}\right) \quad (VI)$$

In the formula (VI), p represents the material density, c represents the specific heat of the material, T represents the temperature, t represents the interaction time, k represents the thermal conductivity.

It is to be understood that, if the powder bed parameters data, the first laser parameters data and/or the second laser parameters data used in the method 200 has changed, the simulation computation should be re-performed, then the subsequent steps of the method 100 can be preceded. For example, if the powder size or the thickness of the powder layer is different, which means the powder bed parameters data is changed, the method 200 should be re-performed to acquire a new simulation temperature field, then step 105 of the method 100 can be preceded.

Referring to FIG. 1 again, the method 100 proceeds to step 105, the simulation temperature field is used to calculate a first simulation temperature of the process area according to a first algorithm. The first simulation temperature represents the simulated temperature of the process area obtained by the ratio-pyrometer in the one-color mode. According to the simulation temperature field, temperature of each node of the process area can be obtained. In an embodiment, the process area is the melting pool of the powder bed fusion process. For the measurement of the ratio-pyrometer in the one-color mode, if measured temperature inside the measuring spot size of the ratio-pyrometer is lower than the measuring limitation of the ratio-pyrometer (i.e. the lowest measuring temperature), the measured temperature is treated as the lowest measuring temperature of the ratio-pyrometer when a temperature computation is performed by the ratio-pyrometer. Accordingly, the first algorithm in which the emissivity is not involved is used in step 105 to calculate the first simulation temperature of the process area. The first algorithm is shown in formula (1).

$$T_{1C} = \frac{T_{HAZ} + T_0 \times (N_P - N_{HAZ})}{N_P} \quad (1)$$

In the formula (1), $T_{1C}$ represents the first simulation temperature, $N_P$ represents number of nodes of the simulated measuring spot size, $N_{HAZ}$ represents number of nodes of the simulated process area corresponding to the simulation temperature field, $T_0$ represents a setting temperature of the ratio-pyrometer (i.e. the lowest measuring temperature of the ratio-pyrometer described above). In an embodiment, the setting temperature of the ratio-pyrometer is 1273 K. $T_{HAZ}$ represents a summation of temperature of all nodes in the simulated process area, which can be calculated by formula (2) below.

$$T_{HAZ} = \Sigma_{i=1}^{N_{HAZ}} T_i \quad (2)$$

Figure 3C:
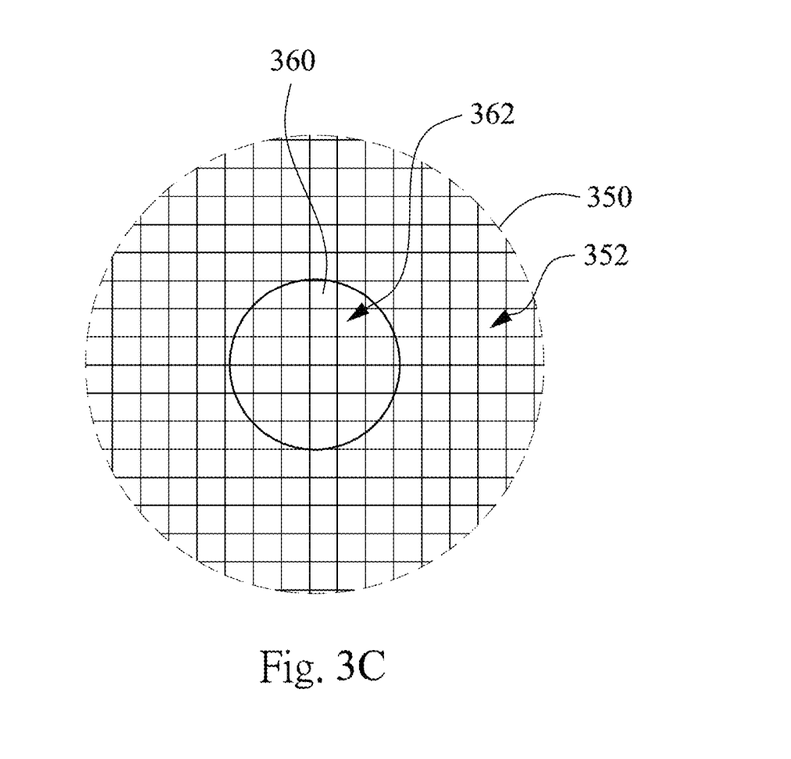
FIG. 3C is a diagram of the measuring spot size and the process area according to one embodiment of the present invention.

In other words, referring to FIG. 3C, FIG. 3C is a diagram of the measuring spot size 350 and the process area 360 according to one embodiment of the present invention. The first algorithm is described below according to FIG. 3C. It is to be understood that each check in FIG. 3C represents a node. The measuring spot size 350 is greater than the process area 360 to be measured, so nodes 352 of measuring spot size 350 includes all nodes 362 of the process area 360. The temperature of each node 362 in the process area 360 [i.e. $T_i$ used in the formula (2)] is obtained from the simulation temperature filed. The temperature of each node 352 in the measuring spot size 350 other than the process area 360 is the setting temperature of the ratio-pyrometer [i.e. $T_0$ used in the formula (1)]. The number of nodes 362 refers to $N_{HAZ}$ above, and the number of nodes 352 refers to $N_P$.

In an embodiment, the simulation computation can only acquire the number of nodes of the simulated process area, hence the number of nodes of the simulated measuring spot size is acquired by a ratio of an area of the simulated process area (e.g. area of the process area 360) to an area of the simulated measuring spot size (e.g. area of the measuring spot size 350). That is, it may be calculated by formula (3).

$$\frac{N_{HAZ}}{N_P} = \frac{A_{HAZ}}{A_P} \quad (3)$$

In the formula (3), $A_P$ represents the area of the simulated measuring spot size of the ratio-pyrometer, and $A_{HAZ}$ represents the area of the simulated process area. In an embodiment, the area of the simulated measuring spot size is modified by an incident angle and a focal length according to experiment settings of the ratio-pyrometer. In an example, the measuring incident angle of the ratio-pyrometer is 45°.

Then, performing step 107, first measurements are performed on the process area by the ratio-pyrometer to acquire first temperatures, in which the ratio-pyrometer is performed in the first one-color mode and the emissivity of the first one-color mode is set to a first emissivity. In an embodiment, the first measurements are performed more than 5 times, and 5 times to 30 times be preferable. In an embodiment, the first emissivity is used as a first emissivity value when an average error between the first temperatures and the first simulation temperature of the process area described above is smaller than or equal to a first default percentage. In an embodiment, the average error is calculated by formula (4) below.

$$\overline{E}\% = \frac{\sum_{k=1}^{n}[(T_k - T_{1C})/T_{1C}] \times 100\%}{n} \quad (4)$$

In the formula (4), $\overline{E}\%$ represents the average error, $T_K$ represents the measured temperatures (i.e. the first temperatures, and second temperatures and third temperatures described below), $T_{1C}$ represents the simulation temperature of the process area (i.e. the first simulation temperature and a second simulation temperature described below), and n represents number of measurement performed.

In other embodiments, the first emissivity is adjusted iteratively when the average error between the first temperatures and the first simulation temperature is greater than the first default percentage, and the emissivity is set to the adjusted first emissivity to perform the first measurements on the process area by using the ratio-pyrometer in the first one-color mode. Step 107 is repetitively performed until the average error between the first temperatures and the first simulation temperature is smaller than or equal to the first default percentage. In an embodiment, the first default percentage is about 0% to about 5%, and it is preferred to be about 0% to about 3%.

Then, performing step 109, second measurements are performed on the process area by the ratio-pyrometer to acquire second temperatures, in which the ratio-pyrometer is performed in the second one-color mode and the emissivity of the second one-color mode is set to a second emissivity. In an embodiment, the second measurements are performed more than 5 times, and 5 times to 30 times be preferable. In an embodiment, the number of the first measurements is the same as or different from the number of the second measurements. In an embodiment, the second emissivity is used as a second emissivity value when the average error between the second temperatures and the first simulation temperature is smaller than or equal to a first default percentage. In other embodiments, the second emissivity is adjusted iteratively when the average error between the second temperatures and the first simulation temperature is greater than the first default percentage, and the emissivity is set to the adjusted second emissivity to perform the second measurements on the process area by using the ratio-pyrometer in the second one-color mode. Step 109 is repetitively performed until the average error between the second temperatures and the first simulation temperature is smaller than or equal to the first default percentage.

The operations of step 107 and step 109 are similar, that is, both are performing measurements on the process area by using the ratio-pyrometer in the one-color mode, the only difference is the measuring wavelength range. By step 107 and step 109, when the temperatures measured in the first one-color mode and the second one-color mode matches with the first simulation temperature (i.e. the average error smaller than or equal to the default percentage), the applied emissivity is the first emissivity value and the second emissivity value, respectively.

Then, performing step 111 selectively, the simulation temperature field acquired from step 103 is used to calculate a second simulation temperature of the process area according to a second algorithm. The second simulation temperature is representing the temperature of the process area obtained by the ratio-pyrometer in the two-color mode. The problem due to the different area between the measuring spot size and the process area in the one-color mode is nonexistent when the measurements are performed by the ratio-pyrometer in the two-color mode. In other words, the problem resulted in the inaccurate measured temperature due to the background temperature is nonexistent. Therefore, the second simulation temperature ($T_{2c}$) is an average temperature calculated from temperatures of each node in the simulated process area, as shown in formula (5).

$$T_{2C} = \frac{\sum_{i=1}^{N_{HAZ}} T_i}{N_{HAZ}} \quad (5)$$

Thereafter, performing step 113 selectively, third measurements are performed on the process area by the ratio-pyrometer to acquire third temperatures, in which the ratio-pyrometer is performed in the two-color mode and the emissivity ratio of the two-color mode is set to a ratio of the second emissivity value obtained in step 109 to the first emissivity value obtained in step 107. In an embodiment, the third measurement is performed more than 5 times, and 5 times to 30 times be preferable. In an embodiment, the ratio of the second emissivity value to the first emissivity value is used as the emissivity ratio when an average error between the third temperatures and the second simulation temperature is smaller than or equal to a second default percentage. In other embodiments, the first emissivity value and/or the second emissivity value are/is adjusted iteratively when the average error between the third temperatures and the second simulation temperature is greater than the second default percentage, and the emissivity ratio is set to another ratio of the adjusted first emissivity value to the adjusted second emissivity value to perform the third measurements on the process area by using the ratio-pyrometer in the two-color mode. Step 113 is repetitively performed until the average error between reacquired third temperatures and the second simulation temperature is smaller than or equal to the second default percentage. In an embodiment, the second default percentage is about 0% to about 15%, and it is preferred to be about 0% to about 10%.

Then, performing step 115, the emissivity ratio is set to a ratio of the second emissivity value to the first emissivity value acquired by step 113, and the ratio-pyrometer in the two-color mode is used to measure temperature of the process area. In an embodiment, selective step 111 and step 113 are not performed, but the ratio of the second emissivity value obtained in step 109 to the first emissivity value obtained in step 107 are used directly for the emissivity ratio of the ratio-pyrometer in the two-color mode to perform step 115.

The following Embodiments are provided to better elucidate the practice of the present invention and should not be interpreted in anyway as to limit the scope of same. Those skilled in the art will recognize that various modifications may be made while not departing from the spirit and scope of the invention. All publication and patent applications mentioned in the specification are indicative of the level of those skilled in the art to which this invention pertains.

The temperature measurement of the melting pool of selective laser melting process is performed in the present embodiment. First, in the experiment, stainless steel 316L powder is provided as material of a powder bed, thickness of the powder bed is 200 μm, and powder size distribution is $d_{10}$=22.94 μm, $d_{50}$=36.52 μm, $d_{90}$=56.88 μm. Parameters of the experiment laser beam includes a power of the laser beam is 15 W, a radius of the laser beam is 60 μm, a scanning speed of the laser beam is 0 mm/s, and laser applying time is 0.1 sec.

A ratio-pyrometer (H322, Sensortherm GmBh, Germany) with a one-color mode and a two-color mode is provided, in which a temperature measuring range of the ratio-pyrometer is 1000° C. to 2500° C. (i.e. 1273 K to 2773 K), and diameter of measuring spot size is 0.9 mm to 8.8 mm. The one-color mode has two measuring wavelength ranges, which are between 1.45 μm and 1.65 μm (a first one-color mode), and between 1.65 μm and 1.80 μm (a second one-color mode). Measuring wavelength range of the two-color mode is between 1.45 μm and 1.80 μm. The focal length of the ratio-pyrometer is 600 mm, and the incident angle of the ratio-pyrometer is 45°.

Then, a simulation computation on the process area is performed. Parameters of the simulation computation include power of the laser beam is 15 W, a radius of the laser beam is 60 μm, a scanning speed of the laser beam is 0 mm/s, and laser applying time is 0.1 sec. Dimension of the powder layer is 1200 μm×1200 μm×200 μm. Material of the powder is stainless steel 316L, in which a melting point of the material is 1648K, and a latent heat of fusion is 300 kJ/kg. According to a simulation temperature field acquired from the simulation computation, a peak temperature for the melting pool is 2525 K, and the process area with temperature over 1273 K is a circular area with a diameter of about 760 μm. According to the simulation computation and the first algorithm described above, the first simulation temperature is 1325.9 K. Moreover, according to the second algorithm described above, the second simulation temperature is 1701.4 K. Additionally, the first default percentage described above is set to 3%, and the second default percentage described above is set to 8%.

Figure 4A:
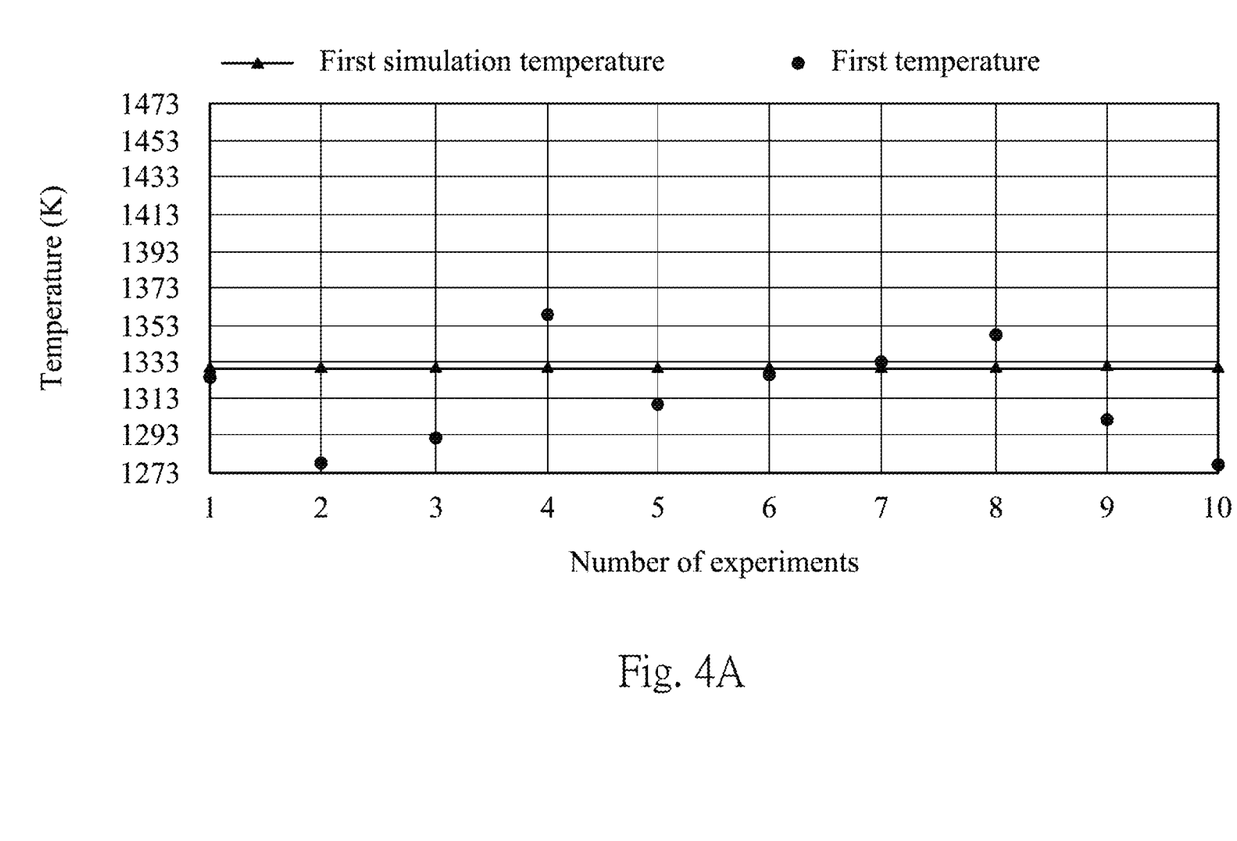
FIG. 4A is a relationship between temperatures measured by a ratio-pyrometer in a first one-color mode and a first simulation temperature according to one embodiment of the present invention.
Figure 4B:
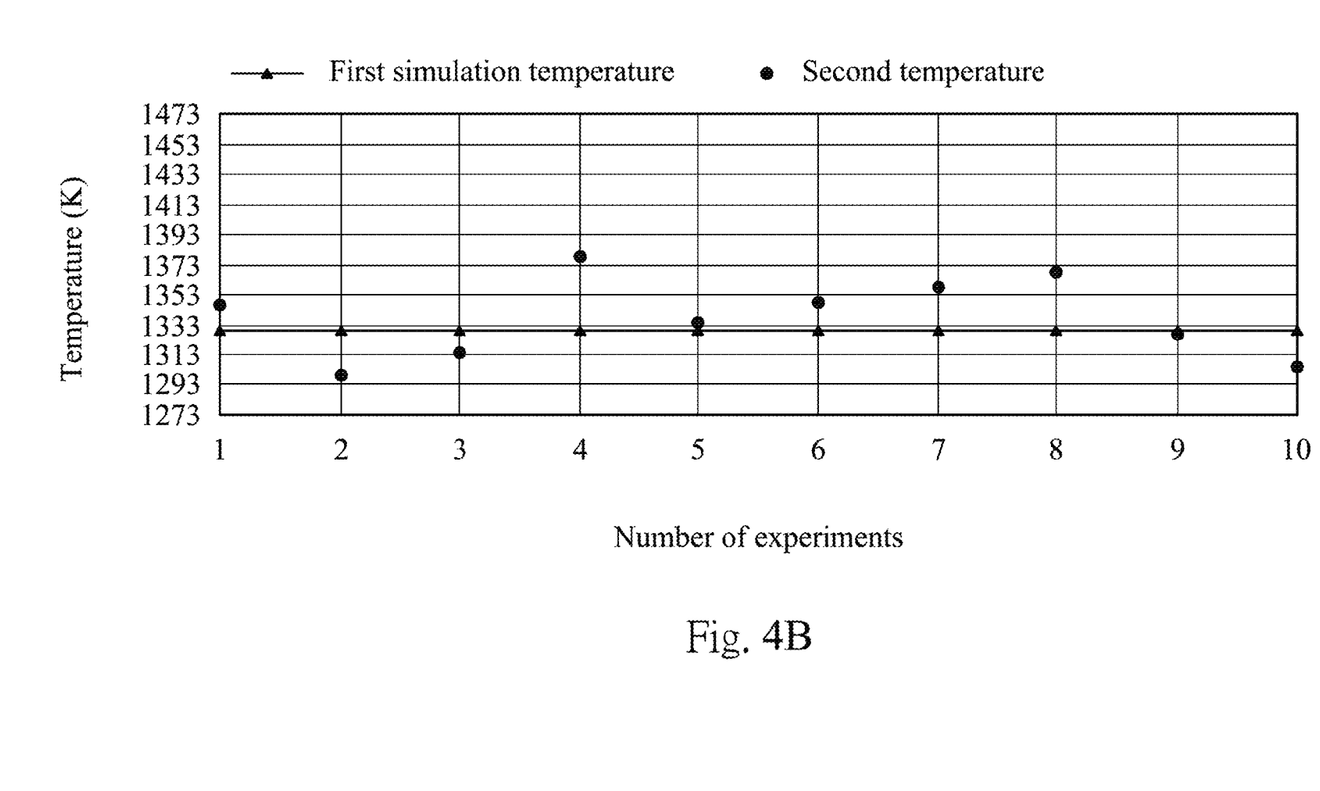
FIG. 4B is a relationship between temperatures measured by a ratio-pyrometer in a second one-color mode and a first simulation temperature according to one embodiment of the present invention.

Thereafter, the ratio-pyrometer in the first one-color mode and the second one-color mode is used to perform temperature measurements on the melting pool for 10 times, respectively. Table 1 shown below records the 10 measurement results from the first one-color mode and the second one-color mode, respectively. FIG. 4A is a relationship between the first temperatures measured by the ratio-pyrometer in the first one-color mode and the first simulation temperature. As shown in table 1 and FIG. 4A, an average of the first temperature is 1314.1 K. A first average error between the first temperatures and the first simulation temperature is 1.12%. Since the first average error is smaller than the first default percentage, which is 3%, the emissivity of 0.64 is set to a first emissivity value. FIG. 4B is a relationship between the second temperatures measured by the ratio-pyrometer with the second one-color mode and the first simulation temperature. As shown in table 1 and FIG. 4B, an average of the second temperature is 1337.7 K. A second average error between the second temperatures and the first simulation temperature is 0.65%. Since the second average error is smaller than the first default percentage, which is 3%, the emissivity of 0.7 is set to a second emissivity value.

TABLE 1

| T(K) | 1 | 2 | 3 | 4 | 5 | 6 | 7 | 8 | 9 | 10 | ε |
|---|---|---|---|---|---|---|---|---|---|---|---|
| first | 1324 | 1277 | 1290.6 | 1358 | 1309.3 | 1325.4 | 1332.1 | 1347.6 | 1300.8 | 1276.8 | 0.64 |
| second | 1346 | 1299 | 1314.3 | 1378.5 | 1334.5 | 1348 | 1357.7 | 1368.2 | 1326.6 | 1304.8 | 0.7 |

Figure 5:
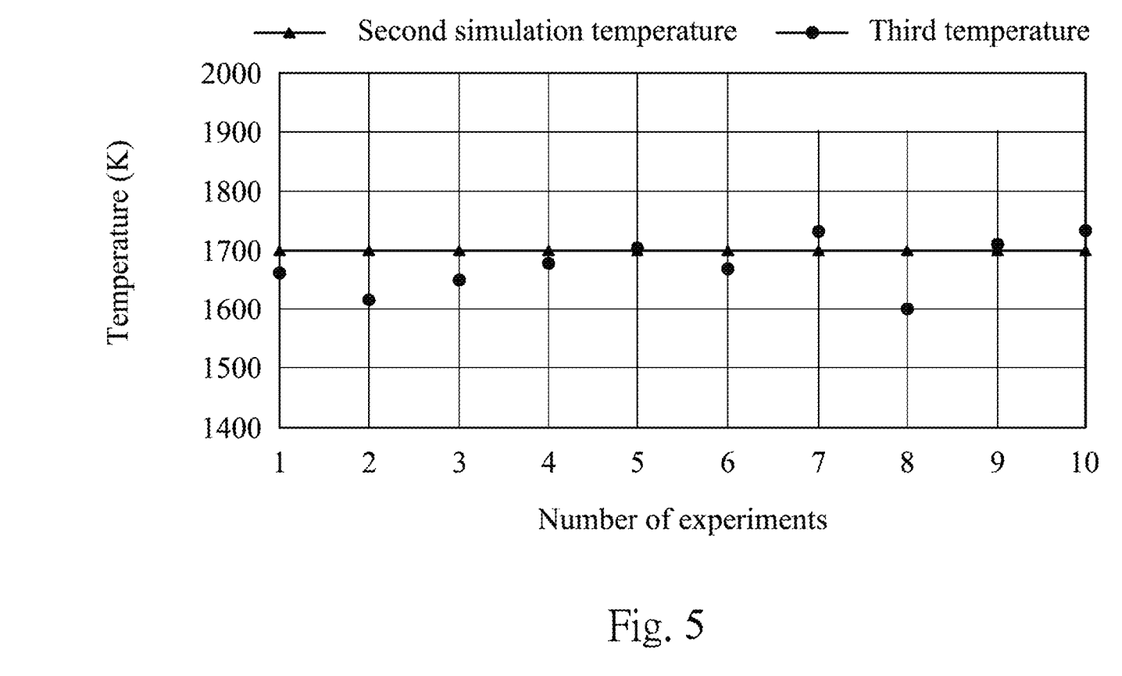
FIG. 5 is a relationship between temperatures measured by a ratio-pyrometer in a two-color mode and a second simulation temperature according to one embodiment of the present invention.

Then, the ratio-pyrometer in the two-color mode is used, and the emissivity ratio is set to a ratio of the second emissivity value (0.7) to the first emissivity value (0.64), which is 1.093. 10 times of temperature measurement on the melting pool are performed, and the average temperature obtained is 1681.5 K. FIG. 5 is a relationship between third temperatures measured by the ratio-pyrometer in the two-color mode and the second simulation temperature. The third temperatures are compared with the second simulation temperature, and the error between them are calculated and recorded in table 2 shown below. An average error of 10 measurements, which is 1.14%, is smaller than the second default percentage of 8%, and as shown in table 2, each error is smaller than the second default percentage. Therefore, the emissivity ratio value is desired.

TABLE 2

| | 1 | 2 | 3 | 4 | 5 | 6 | 7 | 8 | 9 | 10 |
|---|---|---|---|---|---|---|---|---|---|---|
| error % | 2.07 | 5.04 | 2.96 | 0.77 | 0.36 | 1.96 | 1.9 | 6.22 | 0.26 | 1.91 |

Then, the desired emissivity ratio is used to perform another temperature measurement, and the accuracy of the emissivity ratio can be verified again. The same process parameters as the experiment above are used, the only difference is the power of the laser beam, which is 20 W herein. Similarly, the simulation computation is performed first. According to the simulation temperature field, a peak temperature for the melting pool is 2865 K, and the process area with temperature over 1273 K is a circular area with a diameter of about 1105 μm. Additionally, the third simulation temperature is 1725 K.

Figure 6:
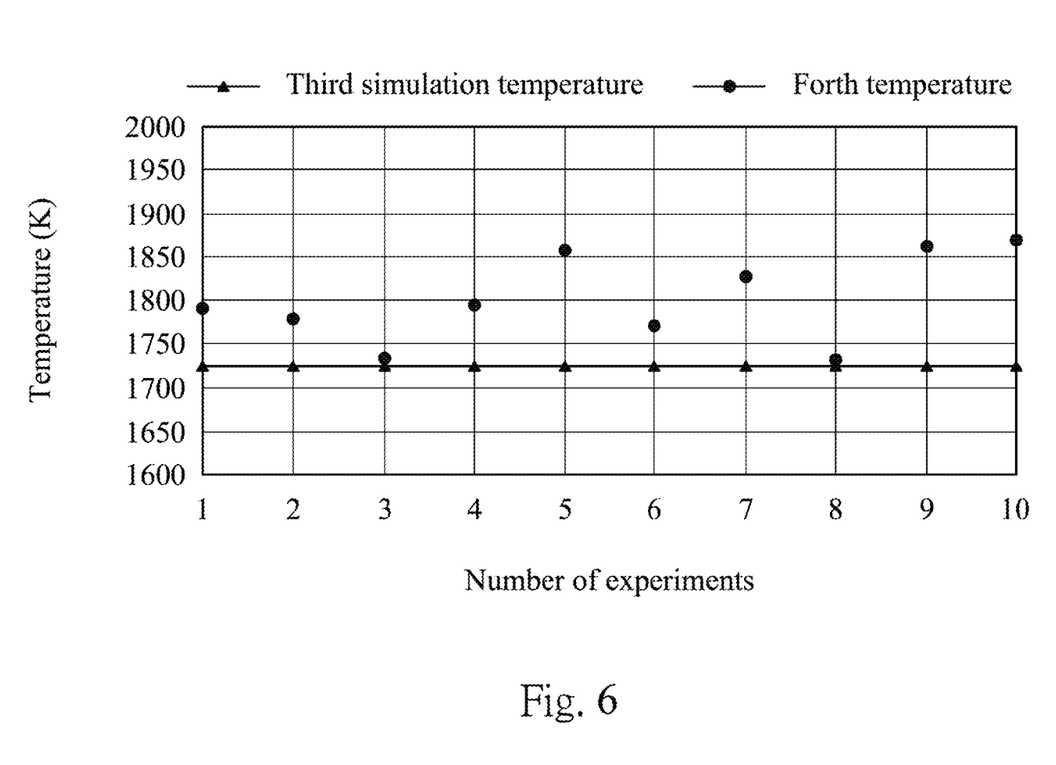
FIG. 6 is a relationship between temperatures measured by a ratio-pyrometer in a two-color mode and a third simulation temperature according to one embodiment of the present invention.

The ratio-pyrometer in the two-color mode is used, and the emissivity ratio of 1.093 is used to perform 10 times of temperature measurement to the melting pool. FIG. 6 is a relationship between the forth temperature measured by the ratio-pyrometer in the two-color mode and the third simulation temperature. The forth temperatures are compared with the third simulation temperature, and the error between them are calculated and recorded in table 3 shown below. An average error of 10 measurements, which is 4.27%, is still smaller than the second default percentage of 8%. Therefore, the emissivity ratio may be set to 1.093, and the ratio-pyrometer in the two-color mode may be used to measure the temperature of the melting pool.

TABLE 3

| | 1 | 2 | 3 | 4 | 5 | 6 | 7 | 8 | 9 | 10 |
|---|---|---|---|---|---|---|---|---|---|---|
| error % | 3.79 | 3.08 | 0.52 | 3.89 | 7.15 | 2.65 | 5.68 | 0.4 | 7.45 | 7.75 |

According to the embodiments above, the present invention provides a method for measuring temperature of process area, which uses a simulation computation and two algorithms with no emissivity involved, to acquire simulation temperature. Then the ratio-pyrometer with two one-color modes is used to perform measurements to find out the first emissivity value and the second emissivity value. The emissivity ratio is set to a ratio of the second emissivity value to the first emissivity value, and the ratio-pyrometer in the two-color mode is used to measure the temperature of the process area.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for measuring a temperature of a process area, the method comprising:

providing a ratio-pyrometer to measure the temperature of the process area, wherein the ratio-pyrometer has a one-color mode and a two-color mode, and the one-color mode includes a first one-color mode and a second one-color mode, and the first one-color mode and the second one-color mode perform respective measurements within a first measuring wavelength range and a second measuring wavelength range emitted from the process area, and the first one-color mode and the second one-color mode perform respective measurements based on emissivities of the process area, and the two-color mode performs measurement based on an emissivity ratio between the emissivities of the process area under the first one-color mode and the second one-color mode;

performing a simulation computation on the process area, thereby obtaining a simulation temperature field including a plurality of simulated process area temperatures;

using the simulation temperature field to calculate a first simulation temperature of the process area according to a first algorithm, wherein the first simulation temperature represents the simulated temperature of the process area obtained by the ratio-pyrometer in the one-color mode;

setting the emissivity of the process area to a first emissivity and a second emissivity respectively for using the ratio-pyrometer to perform a plurality of first measurements and a plurality of second measurements on the process area in the first one-color mode and the second one-color mode respectively, thereby acquiring a plurality of first temperatures corresponding to the first emissivity and a plurality of second temperatures corresponding to the second emissivity;

using the first emissivity as a first emissivity value when an average error between the first temperatures and the first simulation temperature is smaller than or equal to a first default percentage;

using the second emissivity as a second emissivity value when an average error between the second temperatures and the first simulation temperature is smaller than or equal to the first default percentage;

when the average error between the first temperatures and the first simulation temperature and/or the average error between the second temperatures and the first simulation temperature are or is greater than the first default percentage, adjusting the first emissivity and/or the second emissivity iteratively until the average error between the first temperatures and the first simulation temperature and/or the average error between the second temperatures and the first simulation temperature are or is smaller than or equal to the first default percentage; and setting the emissivity ratio to a ratio of the second emissivity value to the first emissivity value, and using the ratio-pyrometer to measure the temperature of the process area in the two-color mode.

2. The method of claim 1, wherein the first default percentage is substantially between 0% and 5%.

3. The method of claim 1, wherein the first algorithm has a plurality of parameters including a number of first nodes of a simulated measuring spot size including a simulated process area, a number of second nodes of a simulated process area corresponding to the simulation temperature field, the simulated process area temperatures, and a setting temperature of the ratio-pyrometer.

4. The method of claim 3, wherein a ratio of the number of first nodes to the number of second nodes is equal to a ratio of an area of the simulated measuring spot size to an area of the simulated process area.

5. The method of claim 4, wherein the area of the simulated measuring spot size is modified by an incident angle and a focal length of the ratio-pyrometer.

6. The method of claim 1, further comprising, before measuring the temperature of the process area:

using the simulation temperature field to calculate a second simulation temperature of the process area according to a second algorithm, wherein the second simulation temperature represents the temperature of the process area obtained by the ratio-pyrometer in the two-color mode, and the second algorithm is different from the first algorithm; and setting the emissivity ratio to a ratio of the second emissivity value to the first emissivity value for the ratio-pyrometer in the two-color mode to perform a plurality of third measurements on the process area, thereby acquiring a plurality of third temperatures, using the ratio of the second emissivity value to the first emissivity value as the emissivity ratio when an average error between the third temperatures and the second simulation temperature is smaller than or equal to a second default percentage;

when the average error between the third temperatures and the second simulation temperature is greater than the second default percentage, adjusting the first emissivity value and/or the second emissivity value iteratively until the average error between the third temperatures and the second simulation temperature is smaller than or equal to the second default percentage.

7. The method of claim 6, wherein the second default percentage is substantially between 0% and 15%.

8. The method of claim 6, wherein the second algorithm has a plurality of parameters including a number of nodes of a simulated process area corresponding to the simulation temperature field and the simulated process area temperatures.

9. The method of claim 1, wherein the simulation computation is used for a powder bed fusion process, and the simulation computation includes providing a set of powder bed parameters data, wherein the powder bed includes a substrate and a powder layer, the powder layer includes a plurality of powders, and the set of powder bed parameters data includes a powder size distribution, a powder layer thickness, a size of a powder container and properties of a powder bed material;

performing a powder bed simulation with the set of powder bed parameters data to acquire a packing density of a powder layer, a plurality of coordinate data of the powders and a thermal conductivity of the powder layer;

obtaining a set of first laser parameters data and a set of second laser parameters data corresponding to a laser beam, wherein the first laser parameters data includes a wavelength of the laser beam, a radius of the laser beam and an incident angle of the laser beam, and the second laser parameters data includes a power of the laser beam, the radius of the laser beam, the incident angle of the laser beam and a scanning speed of the laser beam;

obtaining a first refractive index of the powder and a second refractive index of the substrate according to the set of first laser parameters data;

performing a ray tracing simulation with the coordinate data of the powder, the first refractive index, the second refractive index and the set of first laser parameters data to acquire an absorptivity profile data of the powder layer, wherein the absorptivity profile data is an average absorptivity of the laser beam to a thickness of the powder layer; and performing a heat transfer simulation with the absorptivity profile, the packing density, the thermal conductivity, the set of second laser parameters data and the properties of the powder bed material to acquire the simulation temperature field, wherein the simulation temperature field includes a temperature distribution of the substrate, the powder layer and a melting pool, the melting pool includes a first region of the powder layer with a temperature higher than a melting point of the powder layer and/or a second region of the substrate with a temperature higher than a melting point of the substrate.

10. The method of claim 9, wherein the process area is the melting pool.

* * * * *